United States Patent [19]
Fischell et al.

[11] Patent Number: 5,394,463
[45] Date of Patent: Feb. 28, 1995

[54] TELEPHONE CALL PROCESSING ARRANGEMENT BASED ON CALLING AND CALLED PARTY TELEPHONE SERVICES

[75] Inventors: Sarah T. Fischell, Fair Haven; Roberto S. Freire, Eatontown; Warren R. Moe, Atlantic Highlands; Gary A. Munson, Little Silver; Teresa L. Russell, Atlantic Highlands, all of N.J.

[73] Assignee: AT&T Corp., Murray Hill, N.J.

[21] Appl. No.: 999,427

[22] Filed: Dec. 31, 1992

[51] Int. Cl.6 .............................................. H04M 3/42
[52] U.S. Cl. ...................................... 379/201; 379/207; 379/220
[58] Field of Search ............... 379/269, 230, 207, 221, 379/60, 201, 204, 205, 220, 242, 243, 244

[56] References Cited

U.S. PATENT DOCUMENTS

| | | |
|---|---|---|
| 4,611,096 | 9/1986 | Asmuth et al. ...................... 379/230 |
| 4,757,267 | 7/1988 | Riskin .................................. 379/113 |
| 4,827,500 | 5/1989 | Binkerd et al. ...................... 379/207 |
| 5,003,584 | 3/1991 | Benyacar et al. ................... 379/127 |
| 5,018,191 | 5/1991 | Catron et al. ........................ 379/207 |
| 5,063,591 | 11/1991 | Jodoin .................................. 379/60 |
| 5,131,024 | 7/1992 | Pugh et al. .......................... 379/204 |
| 5,136,636 | 8/1992 | Wegrzynowicz .................... 379/201 |
| 5,187,710 | 2/1993 | Chau et al. .......................... 379/116 |
| 5,251,255 | 10/1993 | Epley .................................. 379/230 |

OTHER PUBLICATIONS

Newton, "Newton's Telecom Dictonary," 1993, pp. 18–19.

Primary Examiner—James L. Dwyer
Assistant Examiner—Daniel S. Hunter
Attorney, Agent, or Firm—Frederick B. Luludis

[57] ABSTRACT

A telephone services functionality is disposed in a telecommunications network to ensure that a telephone call is processed in accordance with the telephone services respectively subscribed to by the calling and called parties. In addition, the functionality retains control over the call so that it may respond to service requests entered by either the calling or called party at any point following establishment of the call connection.

9 Claims, 8 Drawing Sheets

| KEYS | CONTROL |
|---|---|
| ANI<br>LONG DISTANCE<br>POTS TEL NO. | CALLING PARTY SERVICE |
| ANI<br>MEGACOM<br>900 TEL. NO. | CALLING PARTY SERVICE |
| ANI<br>LONG DISTANCE<br>800 TEL. NO. | CALLED PARTY SERVICE |
| ⋮ | ⋮ |
| 800 TEL. NO. | CALLED PARTY SERVICE |
| | |

410
411
412
413
414

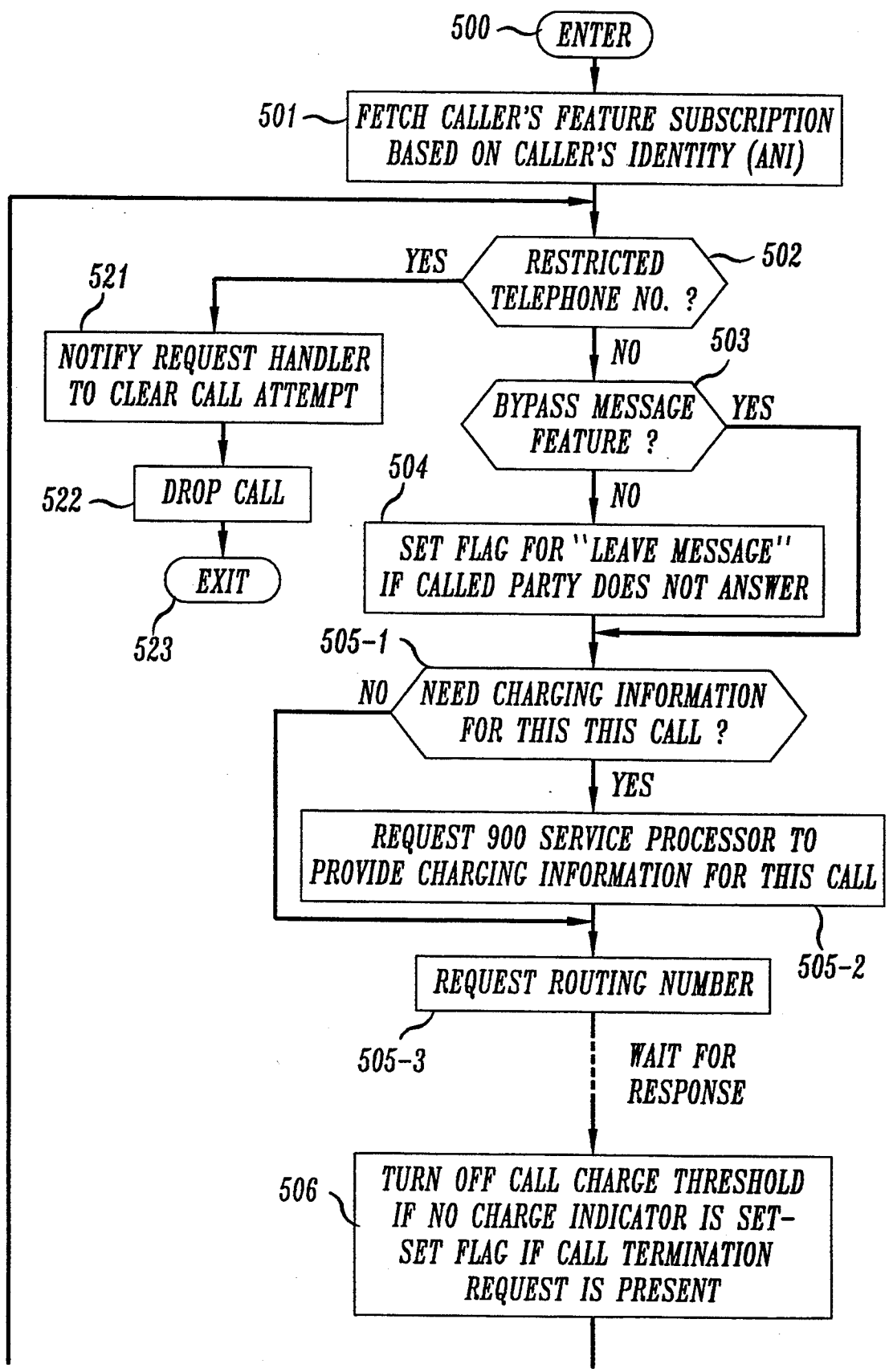

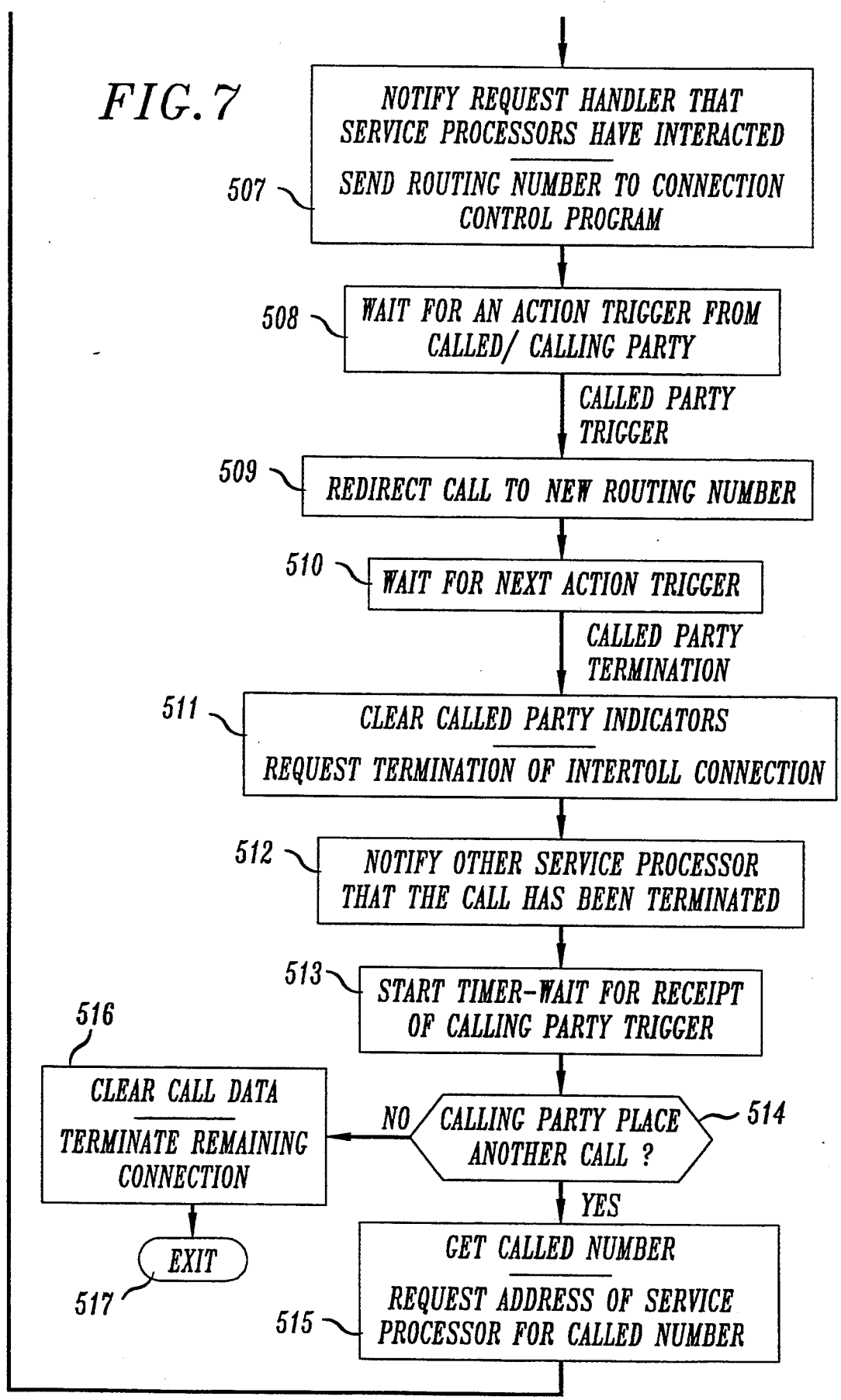

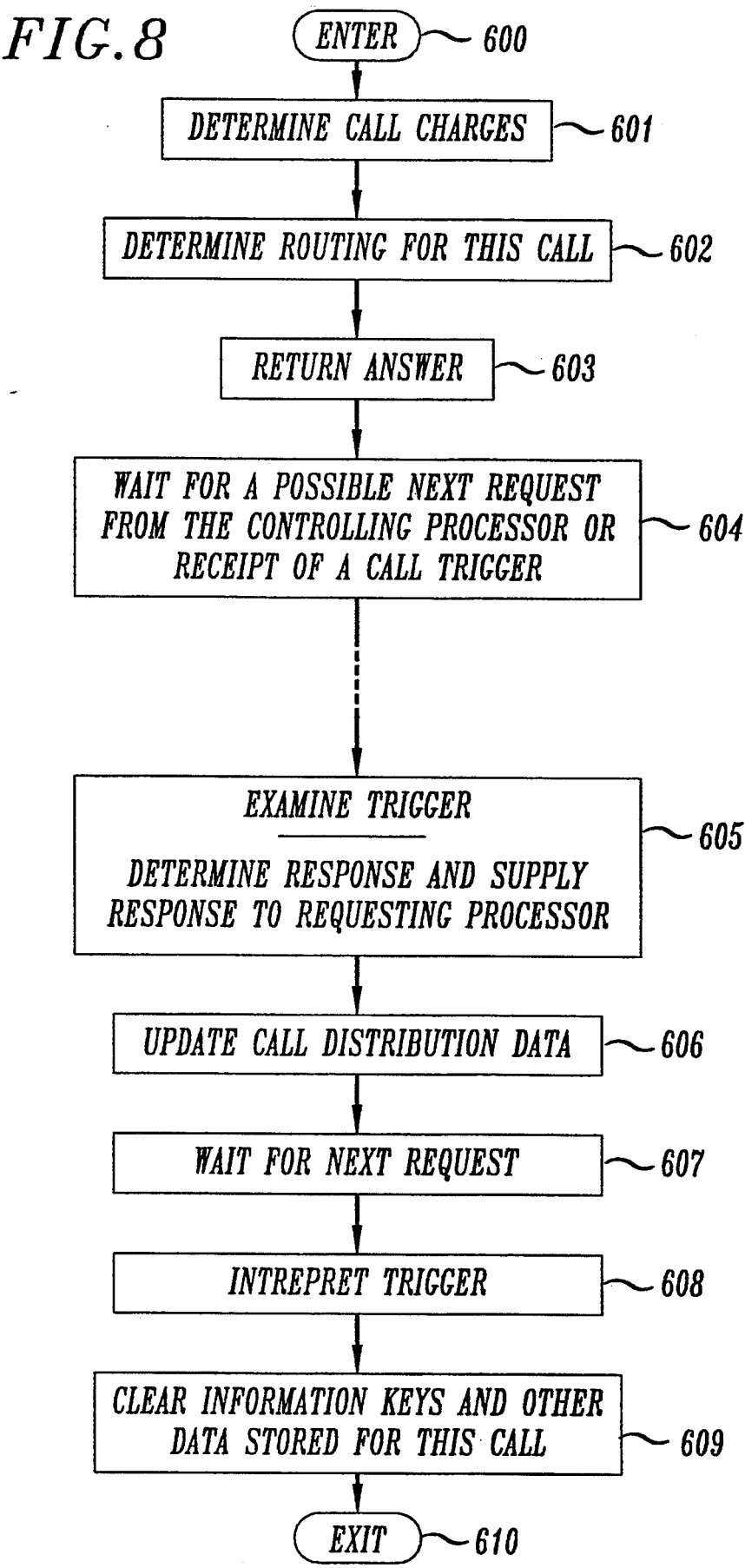

TELEPHONE CALL PROCESSING ARRANGEMENT BASED ON CALLING AND CALLED PARTY TELEPHONE SERVICES

The invention relates to telecommunications networks and more particularly relates to the processing of a telephone call.

BACKGROUND OF THE INVENTION

Telecommunications networks presently offer a number of different services to their subscribers. Such services (and their features) include, for example, 800 service (automatic call distribution, call queuing, interactive announcements, digit collection, etc.), virtual private networks (abbreviated dialing, authorization codes, caller privileges, etc.) and plain old telephone service (call waiting, call forwarding, automatic call back, etc.).

Currently, a switch in a telecommunications network processes a telephone call in accord with the services associated with only one of the parties involved in the telephone call. For example, if a called party is a subscriber of a particular service, e.g., an 800 service, then the switch processes the call in accord with that service without considering the telephone services subscribed to by the calling party.

SUMMARY OF THE INVENTION

An advancement in the art of processing telephone calls is achieved by providing, in accordance with the invention, an arrangement in which the processing of a telephone call is shared between services respectively associated with the calling and called parties. More specifically, a network switch responsive to receipt of a telephone call and associated calling information identifies, as a function of the calling information, the network service processors that implement the network services subscribed to by the calling and called parties and passes the calling information to the identified processors. The switch then forwards the call and/or provides other capabilities based on information that it receives from the identified processors, where the information is determined as a result of the identified processors communicating with one another. Thereafter, the identified service processors control the processing of the call so that they may respond to a service request entered by either the calling or called parties.

BRIEF DESCRIPTION OF THE DRAWING

In the figures:

FIG. 8 shows in flow chart form the program which implements the principles of the invention in the 900 services processor of FIG. 1.

DETAILED DESCRIPTION

Figure 1:
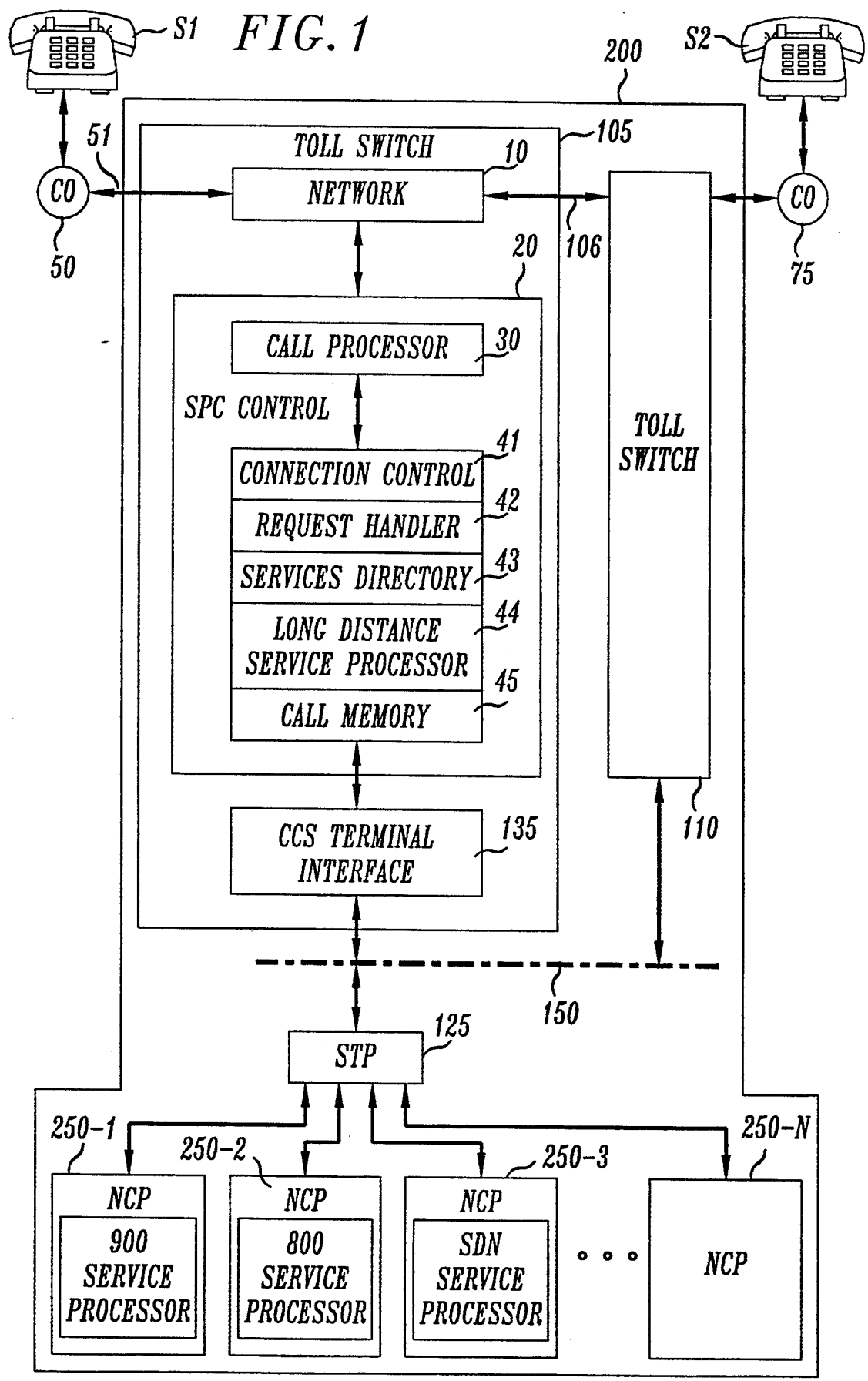
FIG. 1 is a broad block diagram of a telecommunications network in which the principles of the invention may be practiced.

Turning now to FIG. 1, there is shown network 200, which may be, for example, the AT&T public switched network, that provides a number of different calling services for its subscribers, e.g., the subscribers associated with station sets S1 and S2. Network 200 includes, inter alia, a plurality of toll switching (TS) offices, e.g., TS 105 and TS 110, which are interconnected via intertoll network 106. Such toll switches may be any one of a number of different types of switching equipments, for example, the No., 4ESS (Electronic Switching System) or No. 5ESS commercially available from AT&T. (4ESS and 5ESS are trademarks of AT&T.) Such toll switches are also interconnected via data link 150, which may be, for example, the well-known Common Channel Signaling (CCS) network. The toll switches access data link 150 via their respective CCS terminal interface unit 135 to exchange messages with one another, in which the messages relate to the processing and routing of telephone calls.

Each such toll switch may also be connected to a plurality of Central Offices, such as CO 50 in the case of TS 105 and CO 75 in the case of TS 110. A CO is arranged to connect a calling telephone station set (e.g., S1) which has dialed a telephone number that is outside of the calling area served by the CO to an associated network 200 toll switch (originating toll switch), e.g., TS 105. A CO is also arranged to connect a call that it receives from an associated toll switch (destination toll switch), e.g., TS 110, to a telephone station set, e.g., station S2, that the CO serves.

Network 200 also includes a number of conventional Network Control Points (NCP) 250-1 through 250-N. Each such NCP includes, in accord with an aspect of the invention, a service processor which implements one or more network 200 services, e.g., 800 services. In an illustrative embodiment of the invention, a service processor, e.g., processor 250-1, which implements 900 services, operates to control the processing of a call in behalf of a network 200 subscriber who subscribes to the particular service, in which the subscriber may be either the calling or called party. What this means is that, in accord with an aspect of the invention, a number of service processors, e.g., two, may be involved in the processing of a call in behalf of the calling and called parties, respectively. For example, if the calling party subscribes to conventional long distance service and the called party subscribes to 900 services then both 900 service processor 250-1 and long distance service processor 44 may be involved in the call, as will be discussed below. (In an illustrative embodiment of the invention, a long distance service processor 44 is associated with each toll switch, rather than an NCP.)

It is seen from the figure that a toll switch, e.g., 105, includes, inter alia, network 10 and stored program control 20. Network 10 operates under the control of Stored Program Control (SPC) 20 to connect a call received via an incoming trunk, or port, to an outgoing trunk, or port for presentation to either intertoll network 106 or a particular CO, as the case may be. SPC 20 includes, inter alia, conventional call processor 30, connection control 41 and call memory 45, which implement basic call processing functionalities in the associated toll switch. SPC also includes request handler 42 and services directory 43 which operate in concert with one another and with the various service processors, e.g., processor 44, to implement the invention in a toll switch, e.g., TS 105, as will be discussed below.

Figure 2:
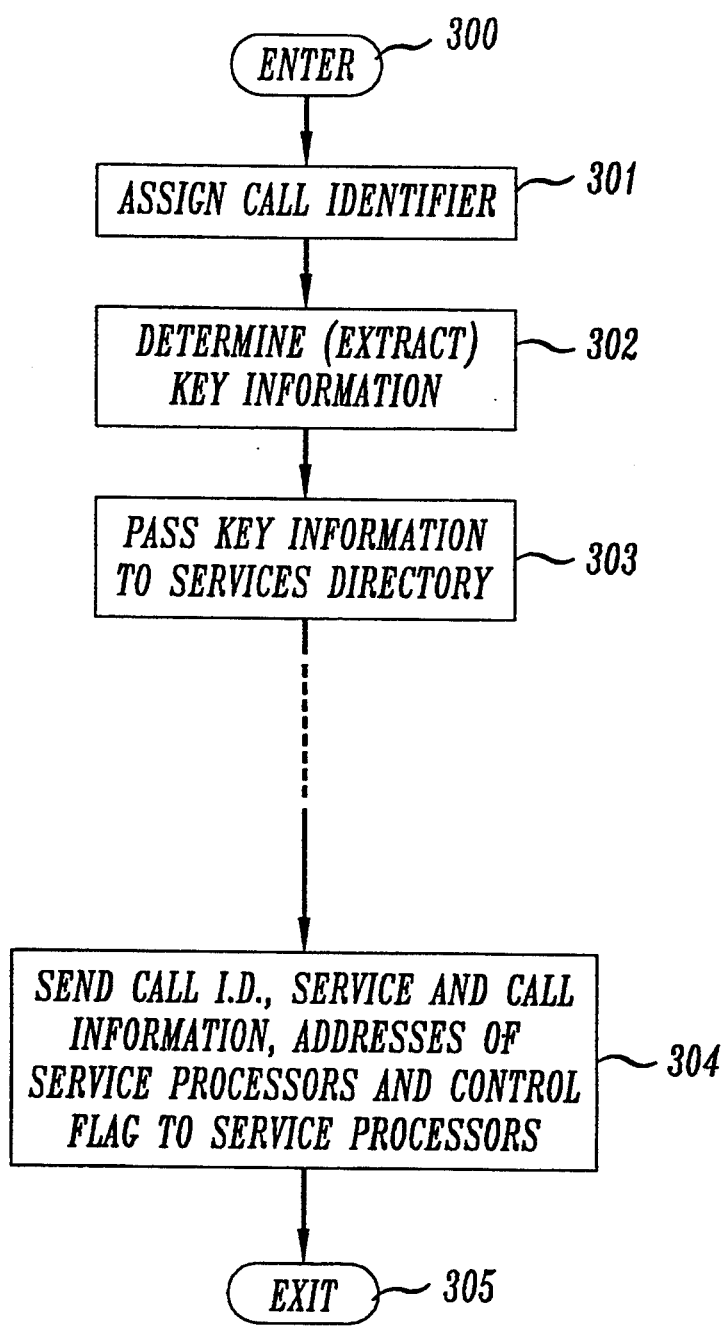
FIGS. 2 and 9 show in flow chart form the program which implements the request handler of FIG. 1 in a toll switch.

Specifically, and with reference to FIG. 2, request handler 42 responds via processor 30 to receipt of an initial request for service (block 300) (i.e., receipt of an incoming call) and associates the call with a respective identifier (block 301 ). Handler 42 also receives signaling (calling) information associated with the call from either CO 50 or intertoll network 106, and extracts (block 302) a number of information "keys" from such information. As will be discussed below, services directory 43 uses such keys to identify the network services associated with the calling and called parties, and thus, in accord with an aspect of the invention, the service logic modules (processors) that will respectively control the processing of the call in behalf of the calling and called parties. Such signaling information is typically transported via one of a number of signaling paths, which include in-band signaling that is transmitted by a CO, e.g., CO 50, when the CO presents a call to network 200 via a trunk of a trunk group (designated 51 in the figure) connected to network 200. It also includes CCS signaling via CCS network 150, in which case the signaling, or calling, information is contained in a so-called Initial Address Message (IAM), or ISDN signaling via an ISDN network (which is also represented herein by path 51), in which case such information is contained in a Q.931 message.

The aforementioned key information may include, inter alia, the called telephone number, Automatic Number Identification (AND, service identity, or label (e.g., SDN (Service Defined Network call), credit card number, etc. When handler 42 extracts all of or a number of those keys, it then passes them to services directory 43 (block 303). Services directory 43, in turn, identifies the service logics that will respectively process the call in behalf of the calling and called parties as a function of the keys that it receives from handler 42. In a typical case, the calling and called parties may be associated with conventional long distance service. In that case then, services directory 43 will determine that service logic, or processor, 44 will process the call in behalf of both parties. Services directory 43 also determines which service logic initially controls the processing of the call, as will be explained below.

Figure 3:
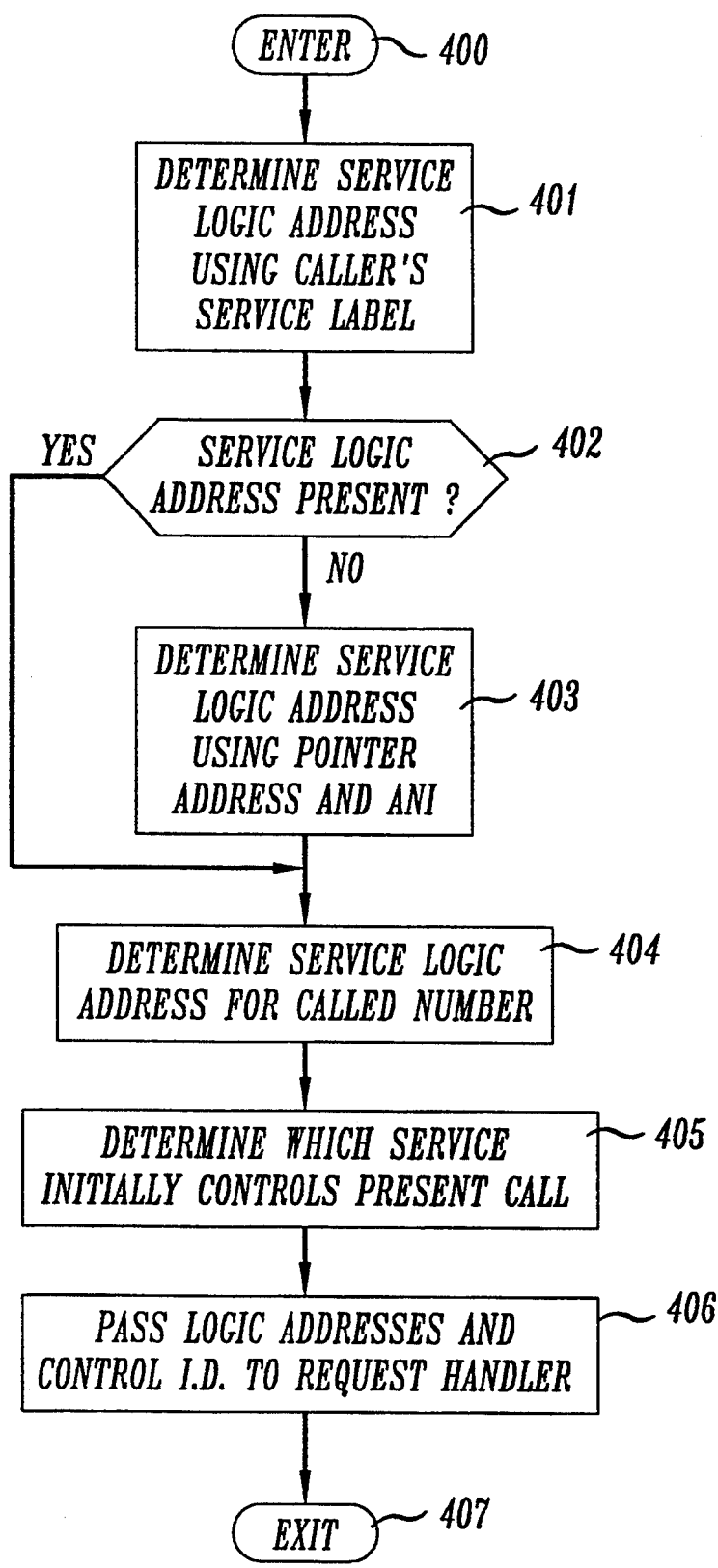
FIG. 3 shows in flow chart form the program which implements the services directory of FIG. 1 in a toll switch.
Figures 4, 5, 6, 7:
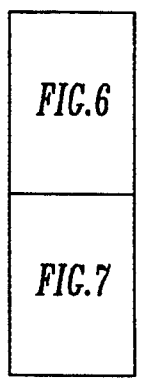
FIG. 4 illustrates a translation table which the program of FIG. 3 uses to determine which service processor is to have initial control over the processing of a call.
FIG. 5 illustrates the manner in which FIGS. 6 and 7 should be arranged with respect to one another.
FIGS. 6 and 7 show in flow chart form the program which implements the principles of the invention in the long distance service processor of FIG. 1.

More particularly, the services directory program is entered at block 400 of FIG. 3 as a result of receiving the aforementioned key information from handler 42. Upon being so entered, the services directory program proceeds to block 401 where it determines the address of the service logic processor that will process the call in behalf of the calling party. The program makes such a determination by performing a conventional translation (i.e., table look-up) using the service-label key associated with the calling party. In some instances, the results of the translation is a pointer address (as determined at block 402), rather than the address of a service processor. In that instance then, the service directory program at block 403 performs another conventional translation (e.g., table look-up) using the pointer address and using the calling party ANI as an index to obtain the address of the aforementioned service processor (logic module). The program then proceeds to block 404 where it similarly processes the called telephone number to determine the address of the service processor that will process the call in behalf of the called party. The program then proceeds to block 405 where it determines which one of the identified service processes will initially control the processing of the call. The services directory program employs a particular translation table to make that determination. An illustrative example of such a table is shown in FIG. 4.

Specifically, table 410 is indexed using a number of information keys, if present. Such information keys include ANI, calling party service label and called party service label, as shown in the left-hand column. For example, assume (a) ANI is present, (b) the calling party service is long distance service and (c) the called party service is also long distance service (i.e., plain old telephone service (POTS)). Based on those keys, then, in accord with entry 411, the calling party service processor is given initial control of the call. In certain instances, the calling party service is given initial control as indicated by entry 412, and thereafter passes such control to the called party service. As another example, the translation carried out via table 410 may result in giving initial control of a call to the called party service processor as shown for entry 413. Similarly, if only one of the keys is present (entry 414), then a determination is based on that information alone.

Returning to FIG. 3, when the determination at block 405 has been completed then the directory services program proceeds to block 406 where it passes the addresses of the identified service processors and control information determined at block 405 to request handler 42. The services directory program then exits via block 407, thereby returning control to request handler 42 as implemented at block 304 of FIG. 2.

It is noted that the dashed line shown in FIG. 2 represents the processing of the key information by the directory services program and re-entry of the request handler program at block 304. The request handler program at block 304, more particularly, notifies the service processor that will initially control the processing of the present call and passes the associated call information thereto. Such notification is in the form of a message containing, inter alia, (a) the call identifier, (b) the aforementioned key information and call information (c) an indicator flag indicating which service processor, e.g., service processor 250-1 (FIG. 1) has initial control of the call and (d) the address of the other service processor, e.g., processor 44. The request handler program then sends the message to the controlling processor via call processor 30. The request handler program then exits via 305.

It is noted that other sections (not shown in FIG. 2) of the request handier program may be invoked during the processing of the call, as will be shown below. It is also noted that call processor 30 may transmit the aforementioned message to the intended recipient (i.e., the identified service processor) via CCS network 150 and conventional Signal Transfer Point 125 (FIG. 1). If the intended recipient happens to be service processor 44, then call processor 30 passes the message thereto via an internal queuing arrangement (not shown).

With the foregoing in mind, we now discuss an illustrative example of the way in which two service processors interact with one another in order to process a telephone call in behalf of the calling and called parties, respectively. In particular, assume that the subscriber associated with station set S1 independently subscribes to (has selected) a number of long distance call features provided by network 200. Assume that the subscription includes (a) a threshold on telephone call charges per telephone call, e.g., a threshold of ten dollars; (b) sequence dialing; (c) restricted calling and (d) a messaging service for calls that are not completed as a result of the called party not answering the call. Also assume that the subscriber has placed a 900 services call via station set S1.

In that event then, services directory 43, in the manner described above, determines (based on table 4 10, FIG. 4) that long distance service processor 44 will control and process the call on behalf of the caller and that 900 service processor 250-1 will process the call on behalf of the called telephone number. Accordingly, request handler 42, in the manner discussed above, directs the initially controlling processor, i.e., service processor 44, to process the call.

More particularly, and referring to FIG. 6, the service processor 44 program is entered at block 500 upon receipt of the initial request handler 42 message containing the aforementioned keys as well as the address of processors 44 and 250-1. Upon being so entered the program proceeds to block 501 where it uses the caller's I.D. (ANI) to obtain from associated memory (not shown) a list of the service features associated with the caller. The program then proceeds to block 502 to determine whether one such feature restricts the placing of a telephone call to the called 900 service telephone number. If that is the case then the program proceeds to block 521 where it notifies request handler 42 to clear the call attempt. The program then "drops" the call (block 522) and exits via block 523.

If the program finds that call restriction is not applicable, then it proceeds to block 503. At block 503, the program determines if the "leave message" (i.e., voice mail) feature is to be invoked in the event that the called party does not answer the call. For the present call, the program concludes that the feature is not relevant since the call is directed to a 900 service number. Accordingly, the program bypasses block 504 and proceeds to block 505. If the program passes through block 504, then it sets a flag to invoke the messaging feature and then proceeds to block 505.

At block 505-1, the program determines if it needs charging information for the call and proceeds to block 505-3 if that is not the case. Otherwise, the program proceeds to block 505-2 where the program forms a message containing the call identifier ANI and a request requesting call charging and routing information and sends the message to processor 250-1 via interface 135, CCS network 150 and STP 125. Upon receipt of the message, STP 125 forwards the message to processor 250-1 based on the message destination field containing the address of processor 250-1. The program also includes a request for routing information (number) in the message, as represented by clock 505-3. The program then waits for the processor 250-1 response to the message. Upon receipt of the response, which includes the requested routing information (number), the program proceeds to block 506 where it turns off the call charges threshold if the response contains an indicator indicating that the called party will pay for the call. If the response contains a call termination request, then the program sets a flag to notify processor 250-1 of the termination of the call so that the latter processor may complete a billing record for the present call. The program then proceeds to block 507 where it sends a message to the request handler indicating that processor 44 has interacted with processor 250-1. The program then sends a message containing a request to establish a call connection based on the received muting number to connection control 41 of FIG. 1. The program then proceeds to block 508.

(At this point, the call processing program represented by connection control 41 operating through call processor 30 and using the above routing number establishes, in a conventional manner, a connection to the ultimate destination, in which the connection includes a route established via network 10 and intertoll network 106 to the destination toll switch, e.g., TS 110. The destination switch, in turn, forwards the call toward its intended destination.)

At block 508, the long distance service processor program retains control over the call and waits for receipt of a so-called trigger, such as a request or action from either the calling or called party. Assuming that the called party enters a request to redirect the call to a particular telephone number, then the program forms a message requesting an interpretation of the trigger and sends the message to the called party service processor. The latter processor, in turn, interprets the request and returns a routing number to the controlling processor. In response to receipt thereof, the program then proceeds to block 509 where it directs connection control 41 to terminate the current intertoll connection and establish a new connection based on the newly received routing number. The program then proceeds to block 510 to wait for the possible receipt of another trigger.

One such trigger may be the receipt of a disconnect message from the destination toll switch, e.g., TS 110, in which the disconnect message indicates that the called station has been placed in an on-hook state. In that event, the program proceeds to block 511 where it clears the key information relating to the called party from its memory. The program then sends a request requesting termination of the intertoll connection to connection control 41 via request handler 42. Connection control 41, in response to receipt thereof, causes call processor 30 to terminate the identified intertoll connection. However, processor 30 leaves the connection from toll switch 105 to the calling party intact. The program then proceeds to block 512 where it notifies the other service processor involved in the call that the call has been terminated. The program then proceeds to block 513 where it retains control of the call and starts a software timer to wait for the receipt of the next trigger, which may be an indication that the calling party has terminated the call or placed another call, i.e., the calling party is engaged in sequence calling.

At the end of the period of time set by the timer, the program proceeds to block 514 where it determines if the calling party has begun placing another call. If that is not the case, then the program proceeds to block 516 where it terminates the calling party connection by (a) clearing its memory of the associated key information and sending a message requesting such termination to connection control 41 via request handler 42. The program then exits via block 517. If the calling party is placing another call then the program proceeds to block 515 where it obtains a copy of the dialed number from request handler 42 and forms a request to translate the dialed number into the address of the service processor that will process the call on behalf of the called party and then sends the message to the services directory program 43 via request handler 42. The program then retains control of the current call and proceeds to block 502 upon receipt of the latter information.

The 900 service program which directs the operation of processor 250-1 on behalf of the called service is shown in FIG. 8. For the purposes of the current discussion, it is assumed that there are a number of features associated with the pertinent 900 service. For example, one caller may be be charged directly for the 900 service call, whereas another caller (i.e., a so-called premium caller) is not so charged, in which the determination as to who is charged for the call is a function of the caller's ANI. Also, the 900 service processor employs call distribution to equally balance the call load across agents associated with the particular 900 service, in which the agents may be positioned at different locations (destinations).

More particularly, the program is entered at block 600 in response to receipt of a request for call charging and routing information from the service processor processing the call on behalf of the calling party, e.g., processor 44. At block 600, the program associates the message request with the associated call identifier and ANI priorly received from request handler 42. The program then proceeds to block 601 where it determines, based on the associated ANI information, that the calling party is a premium customer and, therefore, the charges for the call will be paid for by the 900 service. The program then proceeds to block 602 where it determines in a conventional manner which 900 service destination the call ought to be directed to in order to maintain the traffic load across agent positions. When the program makes that determination, it then determines which toll switch is associated with the selected agent location, and thus a call destination (routing) number, i.e., the number associated with the destination toll switch, e.g., TS 110. The program then proceeds to block 603 where it forms a message containing, inter alia, (a) the call routing number and (b) a request to be notified at the time that the call is terminated. The program then transmits the message via its associated 900 service processor and CCS network 150 to the requesting processor, e.g., processor 44. The program then proceeds to block 604 to wait for another request from the latter processor or a trigger entered by the called party.

At this point assume that the program receives a message from the controlling service processor requesting an interpretation of a trigger that the controlling processor received from the called party. Also assume that the trigger is indicative of a request to redirect the call to another destination. Such a trigger is typically manifested by signaling information entered by the called party, which information is received by the originating toll switch, e.g., TS 105 via the call connection and then passed to request handler 42 via connection control 41. As will be discussed below, request handler 42 then passes the trigger to the service processor having control of the call. (It is assumed that such signaling information comprises a code, e.g., *2, and a telephone number identifying the new destination.)

The 900 service program, responsive to receipt of the request, proceeds to block 605 where it determines the nature of the request and formulates the appropriate response. Since the trigger is a request (*2) to redirect the call, the program translates the telephone number contained in the request into a destination switch (routing) number and supplies that number to the requesting processor via CCS network 150. The program then proceeds to block 606 where it updates the associated call distribution data to account for the redirection of the present call. The program does so to maintain the aforementioned traffic balance across the 900 service agents. The program then proceeds to block 607 to await for the possible receipt of another trigger from the controlling service processor.

If the program receives such a trigger, then it proceeds to block 608 to interpret and process the request. If the trigger is a message from the controlling processor indicating that the call has been terminated, then the program completes a billing record for the call and updates the aforementioned call distribution dam. The program then proceeds to block 609 where, except for the associated billing record, it erases the information relating to the call, e.g., information keys, from its associated memory. The program then exits via block 610.

Figure 9:
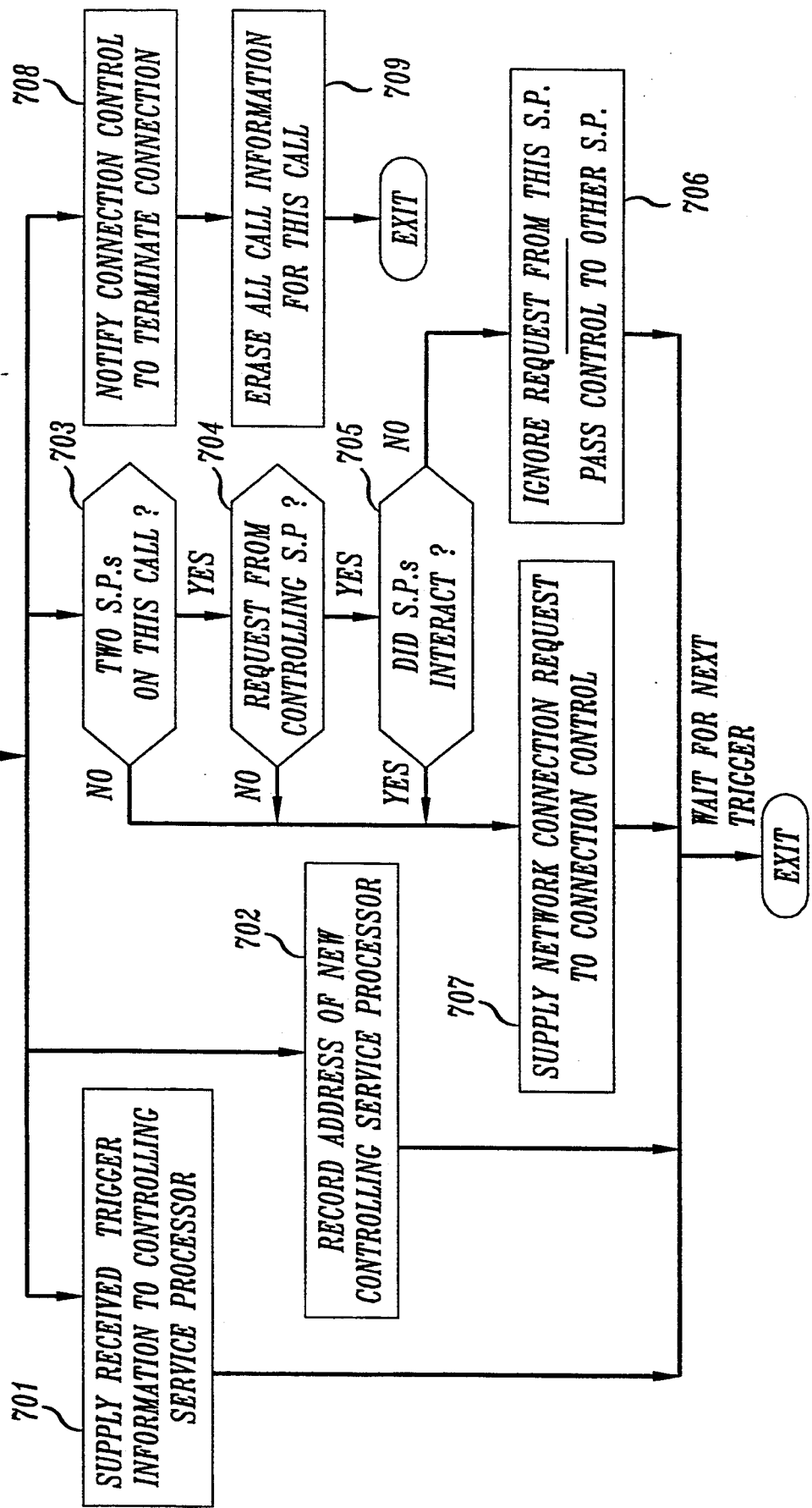

With the foregoing in mind, we now discuss the remainder of the program which defines the operation of request handler 42 with respect to the present call. Turning then to FIG. 9, the request handler program is entered at block 700 responsive to receipt of one of a number of different stimuli and then proceeds to block 701, 702, 703 or 708 based on the nature of the stimuli. In particular, the program proceeds to block 701 if the stimuli is a trigger entered by either the calling or called party. In such a situation the trigger may be, for example, (a) the calling party's response to a voice announcement, (b) digits forming another telephone number that the calling party is placing, or (c) a request for redirection of the call entered by the called party. At block 701, then, the program supplies the trigger to the controlling service processor and then exits to wait for the receipt of the next such trigger. If the trigger happens to be a message from the controlling processor indicating that control of the call has been passed to the other service processor, then the program proceeds to block 702. At block 702, the program stores the address of the new controlling service processor in its associated memory so that it may pass calling or called party triggers thereto and honor a request received from that processor. The program then exits.

Alternatively, if the trigger is a service processor request requesting a network level function, for example, a disconnection or the establishment of a particular call connection, then the program proceeds to block 703 to determine if it will honor the request. Specifically, if the program determines at block 703 that only one Service Processor (SP) is involved in the call then it honors the request by proceeding to block 707. At block 707, the program directs connection control 41 (FIG. 1) to perform the requested network function. If the program determines that two service processors are involved in the call then it proceeds to block 704. At block 704, the program proceeds to block 707 if it determines that the request is from the noncontrolling service processor. Otherwise, it proceeds to the block 705 where it checks to see if it was notified that the controlling processor had interacted with the other service processor involved in the call (see block 507, FIG. 7). The reason for checking to see if such interaction occurred is to ensure that the noncontrolling processor has had an opportunity to be involved in the processing of the pertinent telephone call. If the program finds that such interaction occurred then it proceeds to block 707. Otherwise, it proceeds to block 706 where it discards the received request and then passes control of the call to the noncontrolling service processor so that that processor may have the opportunity to be involved in the call. The program then exits to wait for receipt of the next trigger, if any. The program does this by sending to the controlling processor a message that causes that processor to relinquish control of the call and sending to the noncontrolling processor a message directing that processor to assume control of the call. (Note that the latter processor may assume such control since it was the recipient of the various information associated with the call, as was the former processor.)

If the calling party terminates the call connection, then the trigger which stimulates the entry of the program at block 700 will be a controlling processor request to terminate (clear) the associated call connection. Specifically, responsive to receipt of such a trigger, the program proceeds to block 708 where it directs connection control 41 to terminate the network connection between the calling and called parties. The program then proceeds to block 709 where it erases all information pertaining to the call from its associated memory. The program then exits.

The foregoing is merely illustrative of the principles of the invention. Those skilled in the art will be able to devise numerous arrangements, which, although not explicitly shown or described herein, nevertheless embody those principles that are within the spirit and scope of the invention. For example, the aforementioned service processors may be arranged so that they receive directly any trigger that is entered by the party they are serving, i.e., calling or called party.

We claim:

1. A method of processing a call between calling and called parties in a communications network formed from a plurality of network switches and providing a plurality of different communications services and associated features, said calling and called parties respectively subscribing to first and second ones of said communications services, said method comprising the steps of at an originating one of said toll switches, receiving said call and associated calling information, and identifying, as a function of said calling information, first and second network service processors operative for respectively implementing said first and second services in said network and passing said calling information to said first and second processors, such that said first and second processors cooperate with one another to respectively implement said first and second services and their associated features in said network on behalf of said calling and called parties, and selecting as a function of said calling information one of said first and second processors to control the processing of said call.

2. The method of claim 1 wherein said step of receiving includes the step of receiving routing information determined as a result of said first and second processors communicating with one another and forwarding said call to another one of said switches identified as a function of said routing information.

3. The method of claim 1 wherein said first and second services are different from one another.

4. The method set forth in claim 1 further comprising the steps of assigning initial control of said call to said first processor, and thereafter passing said control to said second processor.

5. The method set forth in claim 1 wherein said first service is a long distance service and said second service is a 900 service.

6. The method set forth in claim 4 further comprising the steps of responding to receipt of a respective telephone service request and passing said request to said controlling processor, and responding to receipt of an instruction from said controlling processor by performing a telephone service functionality indicative of said request.

7. A method of processing a call in a telecommunications network comprising a plurality of interconnected toll switches, said network providing a plurality of different services, said call being originated by a calling party and being forwarded to a called party, said calling and called parties having independently selected respective first and second ones of said network services, said method comprising the steps of at an originating one of said toll switches, responding to receipt of said call and associated calling information by identifying, as a function of said calling information, first and second network processors operative for respectively implementing said first and second services in said network, and selecting, as a function of a number of parameters derived from said calling information, one of said first and second processors to control the processing of said call and supplying said calling information thereto, said first and second processors communicating with each other during the processing of said call so that said first and second services may be implemented in said network on behalf of said calling and called parties, respectively, and responding to receipt of a routing indicator from one of said processors by forwarding said call to a second one of said switches identified as a function of said routing indicator.

8. The method set forth in claim 7 wherein said first service is a long distance service and said second service is a 900 service.

9. The method set forth in claim 7 further comprising the steps of responding at said first switch to receipt of a respective telephone service request and passing said request to said first or second processor based on said request being respectively entered by said calling or called party, and responding to an instruction originating from said first or second processor by performing a telephone service functionality indicative of said request.

* * * * *